(12) United States Patent
Bruening et al.

(10) Patent No.: US 6,719,905 B2
(45) Date of Patent: Apr. 13, 2004

(54) POLYMERIC MEMBRANES FUNCTIONALIZED WITH EGTA LIGANDS, AND PROCESS OF SEPARATING IONS

(75) Inventors: Ronald L. Bruening, American Fork, UT (US); Krzysztof E. Krakowiak, American Fork, UT (US); Anthony J. DiLeo, Westford, MA (US); Tongbo Jiang, Bedford, MA (US)

(73) Assignees: IBC Advanced Technologies, Inc., American Fork, UT (US); Mykrolis Corporation, Bedford, MA (US)

(*) Notice: Subject to any disclaimer, the term of this patent is extended or adjusted under 35 U.S.C. 154(b) by 0 days.

(21) Appl. No.: 10/269,841

(22) Filed: Oct. 3, 2002

(65) Prior Publication Data

US 2003/0089666 A1 May 15, 2003

Related U.S. Application Data

(62) Division of application No. 09/838,660, filed on Apr. 19, 2001, now Pat. No. 6,479,159.

(51) Int. Cl.$^7$ .............................. B01D 61/00; C02F 1/44
(52) U.S. Cl. ..................... 210/634; 210/651; 210/653; 210/490; 210/656; 210/502.1
(58) Field of Search ............................ 210/634, 502.1, 210/651, 654, 653, 490, 635, 681, 656; 428/471, 422, 475.5, 516, 522

(56) References Cited

U.S. PATENT DOCUMENTS

| | | | |
|---|---|---|---|
| 4,618,533 A | 10/1986 | Steuck | |
| 4,943,375 A | 7/1990 | Bradshaw et al. | |
| 4,952,321 A | 8/1990 | Bradshaw et al. | |
| 4,959,153 A | 9/1990 | Bradshaw et al. | |
| 4,960,882 A | 10/1990 | Bradshaw et al. | |
| 5,039,419 A | 8/1991 | Bradshaw et al. | |
| 5,071,819 A | 12/1991 | Tarbet et al. | |
| 5,078,978 A | 1/1992 | Tarbet et al. | |
| 5,084,430 A | 1/1992 | Tarbet et al. | |
| 5,173,470 A | 12/1992 | Bruening et al. | |
| 5,179,213 A | 1/1993 | Bradshaw et al. | |
| 5,182,251 A | 1/1993 | Bruening et al. | |
| 5,190,661 A | 3/1993 | Bruening et al. | |
| 5,244,856 A | 9/1993 | Bruening et al. | |
| 5,250,188 A | 10/1993 | Bruening et al. | |
| 5,273,660 A | 12/1993 | Breuning et al. | |
| 5,334,316 A | 8/1994 | Bruening et al. | |
| 5,393,892 A | 2/1995 | Krakowiak et al. | |
| 5,494,935 A | 2/1996 | Miller et al. | |
| 5,547,760 A | 8/1996 | Tarbet et al. | |
| 5,618,433 A | 4/1997 | Tarbet et al. | |
| 5,622,996 A | 4/1997 | Fish | |
| 5,785,977 A | 7/1998 | Breithbarth | |
| 5,798,221 A | 8/1998 | Aegidius | |
| 5,980,987 A | 11/1999 | Tarbet et al. | |
| 6,479,159 B1 * | 11/2002 | Bruening et al. | ............ 428/471 |
| 6,524,482 B2 * | 2/2003 | Bruening et al. | ............ 210/651 |
| 2002/0153322 A1 * | 10/2002 | Bruening et al. | ............ 210/659 |

* cited by examiner

*Primary Examiner*—Ana Fortuna
(74) *Attorney, Agent, or Firm*—Thorpe North & Western, LLP

(57) ABSTRACT

Compositions and methods for selectively binding specific metal ions, such as $Ca^{2+}$ and $Cd^{2+}$, contained in a source solution are disclosed and described. This is accomplished by the use of a composition comprised of an EGTA ligand covalently bonded to a membrane support. The composition formula of the present invention is M—B—L where M is a membrane having a hydrophilic, partially hydrophilic or a composite membrane with a hydrophilic surface, B is a covalent linkage, and L is an EGTA ligand. The separation is accomplished by passing a source solution containing the ions to be separated through a device containing the membrane-ligand composition, causing the selected ions to be complexed to the EGTA ligands and subsequently removing the selected ions from the device by passing an aqueous receiving solution through the device and quantitatively stripping the selected ions from the EGTA ligand.

11 Claims, No Drawings

POLYMERIC MEMBRANES FUNCTIONALIZED WITH EGTA LIGANDS, AND PROCESS OF SEPARATING IONS

PRIOR APPLICATION

This is a division of application Ser. No. 09/838,660 filed Apr. 19, 2001, now U.S. Pat. No. 6,479,159 B1.

BACKGROUND OF THE INVENTION

Effective methods for the recovery and/or separation of particular divalent metal ions, such as (a) $Ca^{2+}$ from source solutions containing $Mg^{2+}$ and/or other ions and (b) $Cd^{2+}$ from source solutions containing $Zn^{2+}$ and/or other ions, are of great importance in modern technology. It is particularly difficult to remove these particular metal ions in the presence of moderate to strong acids and soluble complexing or chelating agents, such as the halide ions, which have a high affinity for the desired metal ions. It is also difficult to remove the aforementioned divalent metal ions when they are present at low concentrations in solutions containing other metal ions at much greater concentrations. Hence, there is a real need for a process to selectively concentrate certain divalent metal ions when present at low concentrations and particularly when in the presence of acid solutions and other complexing agents.

Some methods for the recovery of divalent metal cations from solution are known in the art. However, the removal and/or separation of specific divalent metal cations is often complicated by a myriad of conditions including the presence of other divalent cations, the presence of other cations in very high concentrations, and the presence of other chelating agents. It is also known that ligands present as solutes in a solvent have the ability to selectively form strong bonds with particular ions or groups of ions present as solutes in the same solvent according to size, donor atom-related properties and other known selectivity characteristics.

Ethyleneglycol-bis-($\beta$-aminoethyl ether)-N,N,N',N'-tetraacetic acid and (ethylenediamine)tetraacetic acid, commonly referred to as EGTA and EDTA respectively, are both ligands that may be used as solutes to complex divalent ions. However, EGTA has a greater selective preference for larger divalent metal ions than EDTA. See *Critical Stability Constants, Volume 1: Amino Acids*, A. E. Martell & P. M. Smith, Plenum Press, N.Y. & London, 1974. Therefore, EGTA is an important ligand for use in complexing larger divalent metal ions.

This being the case, researchers have not previously been able to incorporate EGTA into phase separation systems. This is significant because EGTA present in solution as a solute simply acts to complex selected ions, but does not provide a means for their separation. Specifically, never before has EGTA been successfully covalently bonded to a membrane support. As such, EGTA bonded membranes have not been used in phase separation processes for removing, separating and concentrating larger ionic radii or desired divalent ions from solutions, particularly where such desired ions are present in solutions with smaller and/or similar ions present at a much higher concentration.

As such, it would be useful to provide a composition and method for removing, separating, and/or concentrating certain desired divalent metal ions in solution from other ions, such as (a) $Ca^{2+}$ from $Mg^{2+}$ and/or (b) $Cd^{2+}$ from $Zn^{2+}$, even when the desired ion is present at a low concentration.

SUMMARY OF THE INVENTION

The present invention is drawn to a novel composition comprising an EGTA ligand covalently bonded to a membrane. The invention is also drawn to methods for removing, separating and/or concentrating certain desired divalent metal ions including (a) $Ca^{2+}$ from source solutions containing $Mg^{2+}$ and/or other ions and (b) $Cd^{2+}$ from source solutions containing $Zn^{2+}$ and/or other ions. In fact, the removal of these ions ($Ca^{3+}$ and/or $Cd^{2+}$) may occur when they are present at from very low to very high concentrations, i.e., from ppb to g/l levels of $Cd^{2+}$ and/or $Ca^{2+}$.

The concentration of the desired ions is accomplished by forming a complex of the desired ions with an EGTA ligand bound membrane. The separation is effected in a separation device, such as a membrane cartridge, through which the source solution is flowed. This process enables the desired ions to complex with the EGTA ligand attached to the membrane. The metal ion and the EGTA ligand are then decoupled by flowing a receiving liquid through the separation device (in much smaller volume than the volume of source solution passed through the column) to remove and concentrate the desired ions in the receiving liquid solution. The receiving liquid or recovery solution forms a stronger complex with the desired ions than does the EGTA, or alternatively, temporarily forms a stronger interaction with the EGTA ligand than do the desired metal ions, and thus, the desired metal ions are quantitatively stripped from the ligand in a concentrated form in the receiving solution. The recovery of desired ions from the receiving liquid may be accomplished by various methods commonly known in the art.

DETAILED DESCRIPTION OF THE INVENTION

The present invention provides a composition and method for the removal and/or separation of particular divalent metal ions including $Ca^{2+}$ and/or $Cd^{2+}$ present in low concentrations from a solution utilizing an EGTA ligand attached to a membrane. The present invention is particularly adaptable to the removal of (a) $Ca^{2+}$ from source solutions containing $Mg^{2+}$ and/or other ions, and (b) $Cd^{2+}$ from source solutions containing $Zn^{2+}$ and/or other ions. The invention may also be carried out in moderately acidic solutions, e.g., solutions with a pH greater than about 3.0. Furthermore, the desired selectivity and interaction strength is unexpectedly high despite the fact that one of the four carboxylic acid groups of the ligand is used to attach the ligand to the membrane support.

The present invention requires that the ligand be covalently bonded to a membrane which acts as a support to the EGTA ligand. Specifically, the composition of the present invention comprises an EGTA ligand that is covalently bonded to a membrane as represented Ad Formula 1, as follows:

  Formula 1 where M is any membrane or composite membrane derivatized to have a hydrophilic surface and which contains polar functional groups, L is an EGTA ligand and B is the covalent linkage joining the ligand (L) to the membrane (M) surface. Typically, the EGTA ligand (L) is joined to the membrane surface by the reaction of ligand precursor XL where X is a functional group which reacts with an activated polar group on the membrane surface, thereby forming covalent linkage B. Representative of B linkages are members selected from the group consisting of amide (—NHC(O)—, ester (—C(O)C—), thioester (—C(O)S—), carbonyl (—C(O)—), ether (—O—), thioether (—S—), sulfonate (—S(O)$_2$O—) and sulfonamide (—SO$_2$NH—), though amide bonds are often preferred.

More specifically, the membrane (M) may be inherently hydrophilic, partially hydrophilic or a composite comprising a porous polymer membrane substrate having an insoluble cross-linked hydrophilic coating deposited thereon. Membranes that are inherently hydrophilic or partially hydrophilic and contain moieties appropriate for forming covalent bonds with the ligand (L) have particular utility. Such membranes include polyamides such as nylon, and cellulosic materials such as cellulose, regenerated cellulose, cellulose acetate and nitrocellulose. If the membrane used does not contain reactive groups, it may be modified or derivatized appropriately.

Composite membranes are also preferred. A composite membrane comprises a porous polymer or copolymer membrane core and an insoluble coating deposited thereon. The substrate and the coating may be joined by crosslinking, grafting or by other known procedures. Representative suitable polymers forming the membrane core substrate include fluorinated polymers including poly (tetrafluoroethylene) ("TEFLON"), polyvinylidene fluoride (PVDF), and the like; polyolefins such as polyethylene, ultra-high molecular weight polyethylene (UPE), polypropylene, polymethylpentene, and the like; polystyrene or substituted polystyrenes; polysulfones such as polysulfone, polyethersulfone, and the like; polyesters including polyethylene terephthalate, polybutylene terephthalate, and the like; polyacrylates and polycarbonates; polyethers such as perfluorinated polyethers; and vinyl polymers such as polyvinyl chloride and polyacrylonitriles. Copolymers can also be used for forming the polymer membrane, such as copolymers of butadiene and styrene, fluorinated ethylene-propylene copolymer, ethylene-chlorotrifluoroethylene copolymer, and the like. The preferred membrane is a hydrophilic ultrahigh molecular weight polyethylene (UPE) containing carboxylic groups, such as those described in U.S. Pat. Nos. 4,618,533, 5,618,433 and 5,547,760.

The membrane is selected to yield both selected bulk properties and selected surface properties. For naturally hydrophilic membranes, the selected bulk and surface properties will be provided by the polymer of which the membrane is formed. For composite membranes, the selected bulk properties will be provided by the membrane substrate and the selected surface properties will be provided by the coating.

A composite membrane is formed by depositing a monomer directly on the surface of the substrate, including the inner surfaces of the pores, by in situ deposition of the cross-linked monomer. The desired deposition of the cross-linked monomer onto the porous substrate is effected as a direct coating and does not require or utilize an intermediate binding chemical moiety. Any monomer for the coating polymer can be used so long as it is capable of being polymerized by free radical polymerization and can be crosslinked. The only requirements of the polymerized monomer is that it is capable of coating the entire surface of the porous membrane, that it provide the surface with ligand-reactive functional groups and that it be sufficiently hydrophilic to allow for efficient use of the ligand to be attached. Generally, the porous substrate has an average pore size between about 0.001 and 10 µm and more usually, between about 0.1 and 5.0 µm. The composite membrane is formed by any suitable method, such as is disclosed in U.S. Pat. No. 4,618,533, which is hereby incorporated by reference in their entirety. Briefly, this procedure involves washing the porous membrane substrate with a suitable solvent for wetting the entire surface of the substrate. The substrate is then bathed in a mixture of the free radical polymerizable monomer, a polymerization initiator, and a cross-linking agent in a solvent under conditions to effect free radical polymerization of the monomer and coating of the porous substrate with the cross-linked polymer. The surface of the coated polymer membrane contains hydrophilic or polar-substituents that can be activated to react with and covalently bond the ligands to the membrane surface.

The composite membranes prepared according to U.S. Pat. No. 4,618,533 can contain carboxylic acid moieties on the surface. Other suitable moieties could include hydroxyl, sulfonic acid, epoxy, primary amine and derivatized benzyl groups such as polymers referenced above.

Preparation of a composite membrane by a precipitated crystal technique involves, briefly, washing the porous membrane substrate with a suitable solvent for wetting the entire surface of the substrate. The substrate is then bathed in a solution containing the compound which is to be precipitated. This solution is then removed and the membrane substrate is treated with a compound that precipitates and fixes the crystals to the substrate. The membrane is washed and dried before use.

With composite membranes, the core membrane material is not thought to affect that performance of the derivatized membrane and it is limited in composition only by its ability to be coated, or have deposited on its surface, an insoluble polymer layer that contains the appropriate reactive group. This provides a hydrophilic layer which interacts well with water or other aqueous solutions. The end result is that when the ligand is attached to the surface of either a hydrophilic membrane or a composite membrane having a hydrophilic surface, the basic characteristics of any given ligand molecule are not changed by the process of attaching it to the surface or by the nature of the surface itself.

Formulas similar to the M—B— portion of Formula 1 have been previously described in U.S. Pat. No. 5,547,760 and U.S. Pat. No. 5,618,433, which are incorporated herein by reference. These membranes and attachment mechanisms are instructive to one skilled in the art in practicing the present invention. However it is to be emphasized that the present invention does not reside in the discovery of the M—B— portion of Formula 1. Rather, it is the discovery of the advantageous ion binding capabilities of the EGTA ligand (L) when attached to a membrane (M) via a covalent linkage (B).

EGTA ligands covalently bonded to membranes as shown in Formula 1 are characterized by high selectivity for and removal and separation of desired divalent metal ions, such as $Ca^{2+}$ and/or $Cd^{2+}$, present at from very low to very high concentrations in various source solutions, including source solutions that contain other divalent ions. The source solutions for which the present invention is particularly useful would contain the desired ions and other ions present in greater concentrations which one does not desire to remove. Such other ions can include $H^+$, $Mg^{2+}$ and $Zn^{2+}$.

The present invention also provides methods for removing desired divalent metal ions from solutions that can contain other metal ions present in much higher concentrations by the use of such EGTA ligand bonded membranes disclosed herein. These methods may be carried out in any manner that provides for bringing the ions to be removed from a solution into contact with the EGTA ligands affixed to the membrane. Contact is preferably made in a contacting device comprising a housing, e.g., cartridge, containing the composition of matter of the invention by causing solution containing desired ions to flow through the cartridge and thus come in contact with the composition of the invention. Preferably the membrane configuration is a pleated membrane, although other membrane configurations, such as flat sheet, stacked disk or hollow fibers may be used. However, various contact apparatus may be used instead of a cartridge such as but not limited to a cassette, syringe, unit, canister, multi-well plate or filter holder. The process of selectively removing and concentrating the desired ions is characterized by the ability to quantitatively complex from a larger volume of solution the desired ions, even when they are present at very low concentrations.

The desired ions are recovered from the ligands bound to the membranes by flowing through a small volume of a receiving phase which contains a solubilizing reagent. The solubilizing reagent need not be selective, but merely be capable of forming a stronger complex with the desired divalent metal ion than does the EGTA ligand. Alternatively, the solubilizing reagent may contain ions that temporarily form a stronger interaction with the EGTA ligand than does the desired metal ions. This causes the desired metal ion to be quantitatively stripped from the ligand bound membranes in concentrated form and transferred to the receiving solution. The recovery of the desired metal ion from such a receiving solution is readily accomplished by evaporation, precipitation, or by other known methods.

There are several applications for which one may wish to remove/separate the aforementioned divalent metal ions from solution. An example of such an application is the separation of ppb levels of $Cd^{2+}$ or other divalent metals from concentrated Cu, Ni, Zn, Ag, Pb and/or Hg contained in process streams and industrial effluents. This is true both because of the unsatisfactory technologies presently available or because a more economical method is desired. For example, $Cd^{2+}$ is often present at low concentrations in solutions containing other divalent ions at much greater concentrations. Therefore, the removal of $Cd^{2+}$ from such solutions would be important environmentally because of impurity concerns. Additionally, quantitation and/or removal of $Cd^{2+}$ or $Ca^{2+}$ ions from other non-desirable ions may also be employed. Specifically, this removal process may be implemented when the desired ions ($Cd^{2+}$ and/or $Ca^{2+}$) are present at from very low levels (ppb) to very high levels (g/l), even in the presence of concentrated Cu, Ni, Zn, Ag, Pb and/or Hg process streams.

All of these functions and others may be accomplished by use of the compositions and methods of the present invention. The invention will now be illustrated by the following examples which are not intended to be limiting in any way. All references cited are incorporated herein by reference in their entirety.

EXAMPLES

The following examples illustrate the preferred embodiments of the invention that are presently best known. However, other embodiments may be made within the scope of the disclosure. In certain of the examples, reaction schemes are given that are general in nature and reference to the text of each example may be necessary to clarify each reactant, reaction step, reaction condition and product obtained. Additionally, "MEM" in the following structural examples is intended to represent the membrane substrates

Example 1

Membrane with Carboxy Groups

A 50 ml volume of distilled water adjusted to pH 5.1 by adding MES (4-morpholine ethane sulfonic acid monohydrate). To this solution was added 4 acrylic acid coated UPE (ultra high molecular weight polyethylene; available from Millipore Corporation, Bedford, Mass. under the tradenames Guardian™, Etchgard™, and Rinsegard™) membranes (radius=2 cm) and 0.7 g of 1-(3-dimethylaminopropyl)-3-ethylcarbodiimide hydrochloride (EDC). The solution was stirred for 15 minutes and the membranes were transferred to 50 ml of water with 2 g of 2,2'-(ethylenedioxy)bis(ethylamine). After 24 hours, the membranes (MEM) were washed with water. The product prepared is shown in Formula 2 below:

Formula 2

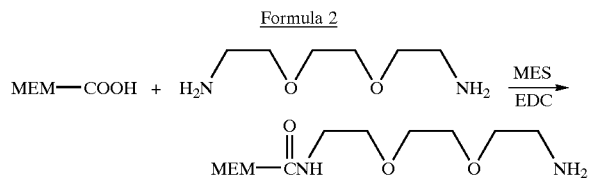

A 1.0 g amount of ethylene glycol-bis(β-aminoethyl ether), N,N,N',N'-tetraacetic acid (Sigma) (EGTA) was dissolved in 50 ml of water. The pH of the solution was adjusted to 4.36 by adding the necessary amount of 2N solution of sodium hydroxide. Next, 0.4 g of 1-(3-dimethylaminopropyl)-3-ethylcarbodiimide hydrochloride also was added. After 10 minutes of stirring, the membranes prepared in Example 1 were added. After overnight contact with the solution, the membranes were washed with water and dried. The product prepared is shown in Formula 3 below:

Formula 3

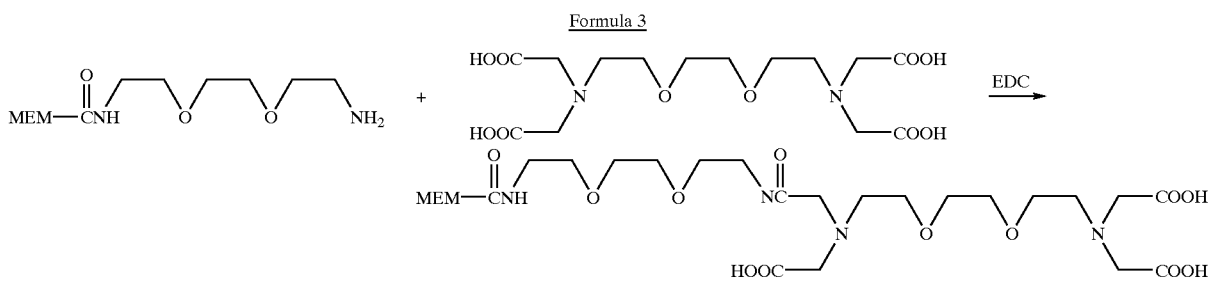

Example 2

Membranes with Ester Groups

Two acrylic acid coated UPE membranes with carboethoxy functional groups (radius=2 cm) and 10 ml of pentaethylenehexamine were added to 100 ml of distilled water at room temperature. After 24 hours, the membranes were washed with water. The product prepared is shown in Formula 4 below:

Formula 4

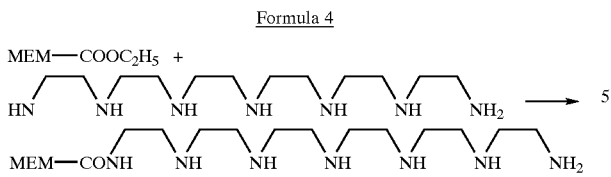

A 1.0 g amount of ethylene glycol-bis(β-aminoethyl ether), N,N,N',N'-tetraacetic acid (Sigma) (EGTA) was dissolved in 50 ml of water. The pH of the solution was adjusted to 4.36 by adding the necessary amount of 2N solution of sodium hydroxide. Next, 0.4 g of 1-(3-dimethylaminopropyl)-3-ethylcarbodiimide hydrochloride was added. After 5 minutes of stirring, the membranes prepared in Example 1 were added. After overnight contact with the solution, the membranes were washed with water and dried. One of the possible products prepared is shown in Formula 5 below:

Formula 5

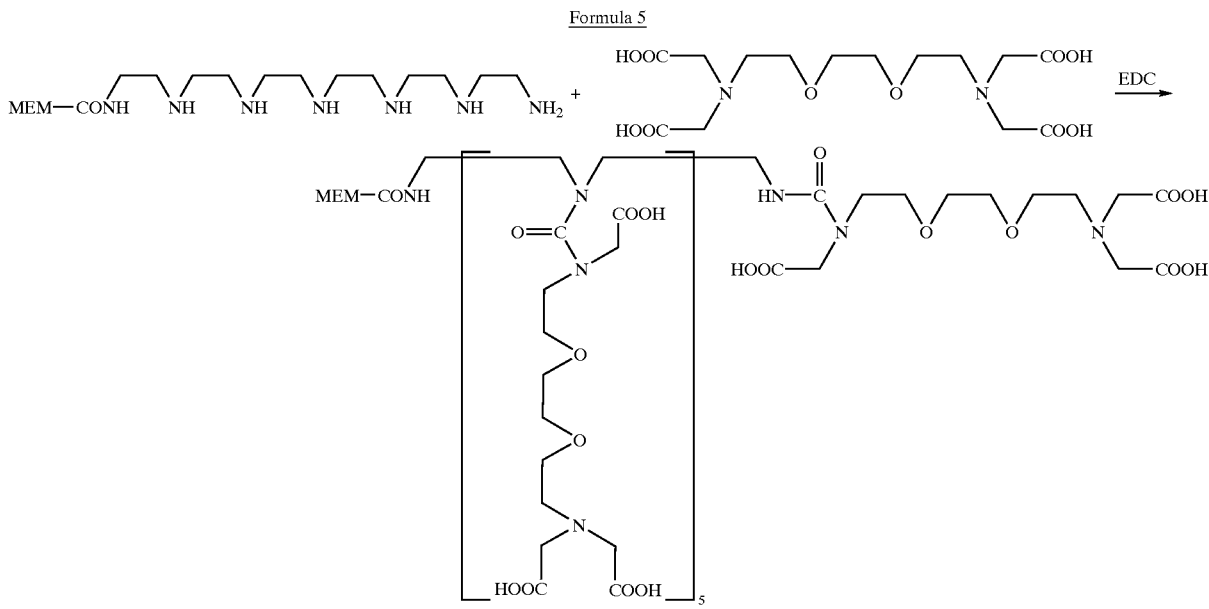

Though Formula 5 above shows a product having six EGTA ligands attached to the membrane, this is not the only possible structure that is produced by above process. It is only required that at least one EGTA be attached to the membrane. Further, each EGTA ligand may be attached to any of the six amine nitrogens capable of accepting the EGTA ligand.

While the invention has been described with reference to certain preferred embodiments, those skilled in the art will appreciate that various modifications, changes, omissions, and substitutions can be made without departing from the spirit of the invention.

What is claimed is:

1. A method for concentrating, removing or separating selected metal ions from a source solution comprising the steps of:

(a) contacting said source solution having a first volume with a composition comprising an EGTA ligand covalently bonded to a membrane, said membrane-ligand composition having the formula:

M—B—L where M is a membrane, L is an EGTA ligand, and B is a covalent linkage formed by the reaction between an activated polar group on the membrane (M) with a functional group on the EGTA ligand (L);

(b) removing the source solution from contact with said composition to which said selected ions have been complexed;

(c) contacting said composition having said selected ions completed thereto with a smaller volume of an aqueous receiving solution in which said selected ions are soluble, or which has greater affinity for such selected ions than does the ligand portion of the composition, or which has a greater affinity for said ligand than does the desired metal ion, thereby quantitatively stripping such selected ions from the ligand; and (d) recovering said selected ions in concentrated form in said receiving solution.

2. A method according to claim 1 wherein B is a covalent linkage selected from the group consisting of amide (—NHC(O)—), ester (—C(O)O—), thioester (—C(O)S—), carbonyl (—C(O)—), ether (—O—), thioether (—S—), sulfonate (—S(O)$_2$O) and sulfonamide (—SO$_2$NH—) linkages.

3. A method according to claim 2 wherein M is selected from the group consisting of hydrophilic membranes, partially hydrophilic membranes and composite membranes.

4. A method according to claim 3 wherein M is a hydrophilic membrane.

5. A method according to claim 4 wherein said hydrophillic membrane is selected from the group consisting of polyamides, cellulose, regenerated cellulose, cellulose acetate and nitrocellulose.

6. A method according to claim 3 wherein M is a composite membrane.

7. A method according to claim 6 wherein said composite membrane is comprised of a coating and a polymer or copolymer substrate, said substrate selected from the group consisting of poly(tetrafluroethylene), polyvinylidene fluoride, polyethylene, ultra-high molecular weight polyethylene, polypropylene, polymethylpentene, polystyrene, substituted polystyrenes; polysulfone, polyethersulfone, polyethylene terephthalate, polybutylene terephthalate, polyacrylates, polycarbonates, polyethers; polyvinyl chloride, polyacrylonitriles, copolymers of butadiene and styrene, fluorinated ethylene-propylene copolymer and ethylene-chlorotrifluoroethylene copolymer.

8. A method according to claim 7 wherein B is an amide bond.

9. A method according to claim 3 wherein said selected ion is selected from the group consisting of $Ca^{2+}$, $Cd^{2+}$ and combinations thereof.

10. A method according to claim 9 wherein said selected ion to be removed is $Ca^{2+}$ and said source solution contains $Mg^{2+}$.

11. A method according to claim 9 wherein said selected ion to be removed is $Cd^{2+}$ and said source solution contains $Zn^{2+}$.

* * * * *